(12) United States Patent
Hawkes et al.

(10) Patent No.: US 8,770,129 B2
(45) Date of Patent: Jul. 8, 2014

(54) DUAL MODE FIBER OPTIC CABLE SYSTEM FOR UNDERWATER REMOTELY OPERATED VEHICLE

(75) Inventors: Graham Hawkes, San Anselmo, CA (US); Charles Chiau, Milpitas, CA (US); Adam Wright, San Anselmo, CA (US)

(73) Assignee: Bluefin Robotics Corporation, Quincy, MA (US)

( * ) Notice: Subject to any disclaimer, the term of this patent is extended or adjusted under 35 U.S.C. 154(b) by 120 days.

(21) Appl. No.: 13/531,112

(22) Filed: Jun. 22, 2012

(65) Prior Publication Data

US 2012/0328372 A1     Dec. 27, 2012

Related U.S. Application Data

(60) Provisional application No. 61/500,246, filed on Jun. 23, 2011.

(51) Int. Cl.
| | |
|---|---|
| *B63B 21/00* | (2006.01) |
| *B63C 11/34* | (2006.01) |
| *G01L 5/10* | (2006.01) |
| *B65H 75/42* | (2006.01) |
| *B65H 75/44* | (2006.01) |
| *B63C 11/42* | (2006.01) |
| *H02G 11/02* | (2006.01) |
| *H02G 1/10* | (2006.01) |

(52) U.S. Cl.
CPC *B63C 11/34* (2013.01); *H02G 1/10* (2013.01); *G01L 5/103* (2013.01); *B65H 75/425* (2013.01); *B65H 75/4484* (2013.01); *B63C 11/42* (2013.01); *H02G 11/02* (2013.01); *B65H 2701/32* (2013.01)
USPC ...................................... 114/230.21; 114/328

(58) Field of Classification Search
USPC .............................. 114/230.21, 210, 254, 328
IPC ......................................................... B63B 21/16
See application file for complete search history.

(56) References Cited

U.S. PATENT DOCUMENTS

| | | | | |
|---|---|---|---|---|
| 4,010,619 A | * | 3/1977 | Hightower et al. | ............ 405/191 |
| 4,458,880 A | * | 7/1984 | Conti | .................... 254/134.3 FT |
| 5,551,545 A | | 9/1996 | Gelfman | ................... 191/12.2 A |

(Continued)

FOREIGN PATENT DOCUMENTS

EP          2327662          6/2011          ............... B63G 7/04

OTHER PUBLICATIONS

"International Search Report", mailed Nov. 6, 2012, PCT/US2012/043460.

*Primary Examiner* — Stephen Avila
(74) *Attorney, Agent, or Firm* — Staniford Tomita LLP

(57) ABSTRACT

A cable containing an optical fiber is used to transmit data between an underwater remotely operated vehicle (ROV) and a support vessel floating on the surface of the water. The ROV pulls the cable through the water and as the ROV dives away from the support vessel, the optical fiber is released from the support vessel. Excess tension in the cable can damage the optical fiber and the tension can be highest close to the ROV. To prevent potential damage to the optical fiber, the ROV can store a portion of the cable and release the cable if the detected tension approaches the maximum working load. When the tension drops to a lower safe level, the release mechanism can stop releasing the cable.

20 Claims, 7 Drawing Sheets

(56) References Cited

U.S. PATENT DOCUMENTS

| | | | |
|---|---|---|---|
| 7,331,436 B1 * | 2/2008 | Pack et al. | 191/12.2 A |
| 7,775,174 B1 | 8/2010 | Humphreys et al. | 114/244 |
| 2010/0050918 A1 * | 3/2010 | Provonchee | 114/210 |

* cited by examiner

DUAL MODE FIBER OPTIC CABLE SYSTEM FOR UNDERWATER REMOTELY OPERATED VEHICLE

CROSS REFERENCE TO RELATED APPLICATIONS

This application claims priority to U.S. Provisional Patent Application No. 61/500,246, "Dual Mode Fiber Optic Tether For Underwater Remotely Operated Vehicle," filed Jun. 23, 2011, the entire contents of which are hereby incorporated by reference.

BACKGROUND

With reference to FIG. 1, remotely operated underwater vehicles (ROV's) 101 are, widely used by industry and science for unmanned undersea work tasks. Some ROVs 101 require an electromechanical cable connection (tether) 105 to the surface for communications and power which are typically located on a boat 109. These cables 105 are thick and heavy because they contain the required electrical conductors to provide power to the ROV 101. As the ROV 101 moves away from the boat 109, the tether 105 is released from a tether storage device 111.

In order to control the movement, the thrust 115 produced by the propulsion device 113 on the ROV 101 must be greater than the tension in the cable 105. The tension on the cable 105 is generated by drag on the cable due to the movement of the cable 105 through the water. The total tension can be proportional to the wetted surface area of the cable 105. Thus, more tension exists in the cable 105 and more thrust is required as the ROV 101 travels farther from the ship 109. This can be problematic because cables 105 can be damaged when the tension exceeds a certain force. What is needed is a system for preventing over tensioning of the cable 105.

SUMMARY OF THE INVENTION

The present invention is directed towards a system for preventing over tensioning of the cable tether between an ROV and a support ship. As the ROV travels away from the support ship, the tension in the cable can be produced by the drag forces on the cable being pulled through the water. These drag forces are proportional to the velocity and the surface area which is the circumference times the length of the cable in the water. In order to control the position of the ROV, the thrust produced by the ROV must be greater than the tension in the cable. Since the cable is being pulled by the ROV, the tension may be highest at the cable connection point with the ROV and the cable tension can decrease at the portions of the cable closer to the support ship.

In order to minimize the drag, the circumference can be minimized by using a cable that only includes an optical fiber which can be used to transmit data between a batter powered ROV and the support ship. The optical fiber can be encased in a plastic sheath that is surrounded by a high strength Kevlar sleeve. The cable can also include an abrasion resistant external coating which can be made of a high strength elastic material such as urethane. By reducing the circumference, the cable drag can be reduced proportionally. For example, an optical fiber cable that is about 2.9 mm in diameter can have a circumference of about 6.6 mm and the exposed surface area is the length of the cable in the water times 6.6 mm. In contrast, a cable that includes electrical conductors to provide electrical power to an ROV might be twice the diameter. A 5.8 mm diameter cable has a circumference of 26.4 mm. Because the exposed surface area of the thinner optical fiber cable is significantly thinner, the drag and tension will also be significantly lower. If the drag is inversely proportional to the circumference, the reduction of the diameter by 50% can result in a 75% reduction in the wetted surface area of the cable and a correspondingly significant reduction in hydrodynamic drag on the cable.

If the cable is exposed to excess tension, the optical fiber can be damaged resulting in cable failure. In order to prevent over tensioning the cable, the ROV can include a system which includes a cable storage unit, a cable tension sensor and a cable release mechanism. If the tension in the cable exceeds a predetermined maximum working tension, the cable tension sensor can detect the excessive tension and cause the cable release mechanism to release some of the cable from the ROV. The cable release can be stopped when the cable tension drops below the maximum force. This intermittent increased tension can be due to water currents, contact with objects or other forces. The thinner cable in combination with the cable release mechanism on the ROV can allow the ROV to travel deeper and farther away from the support ship which can greatly enhance the ability of the ROV to perform the required tasks.

BRIEF DESCRIPTION OF THE DRAWINGS

FIG. 8 illustrates an embodiment of ROV with a hybrid cable.

DETAILED DESCRIPTION

Figure 1:
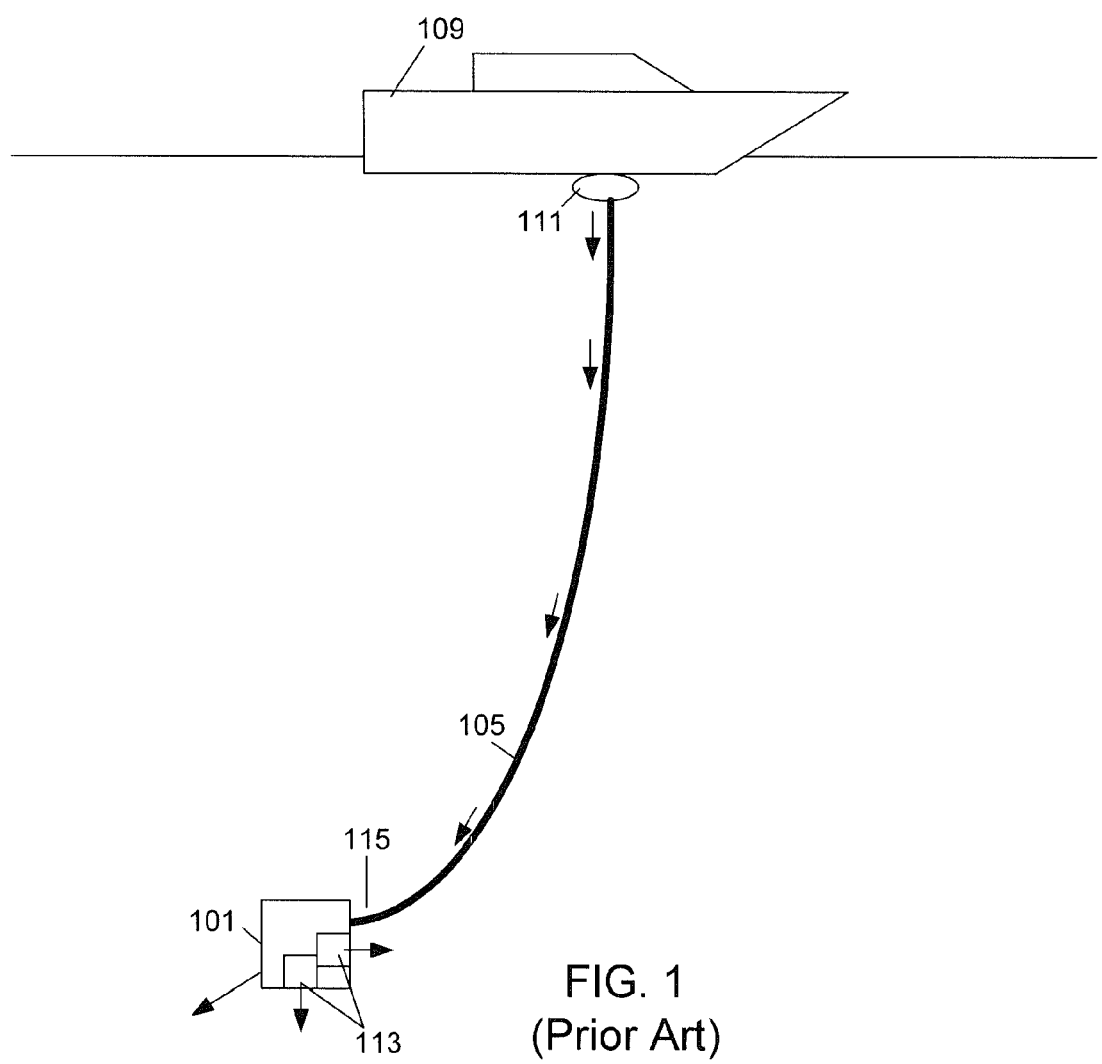
FIG. 1 illustrates a diagram of a ROV.
Figure 2:
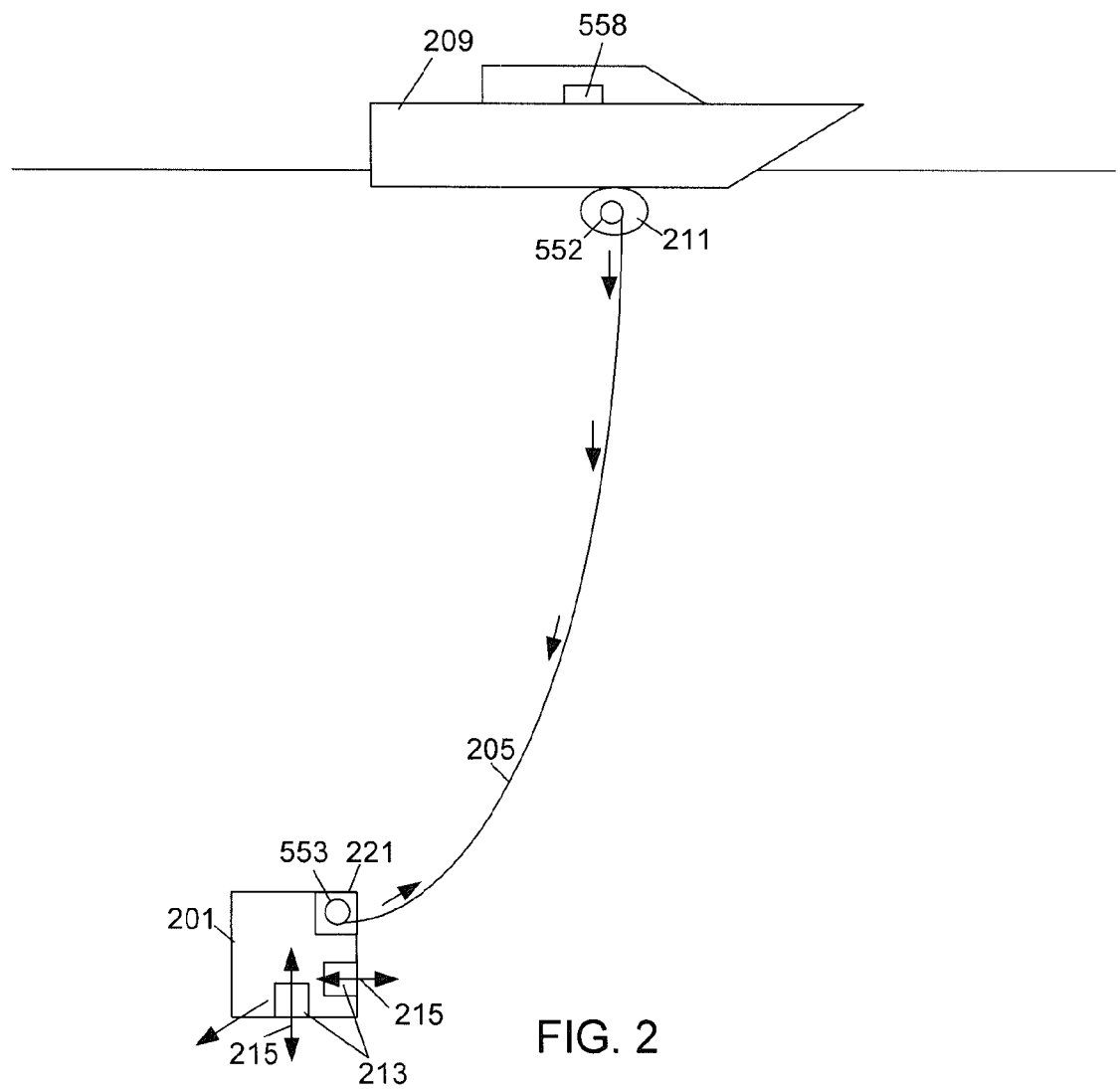
FIG. 2 illustrates a diagram of a ROV with a cable tension control mechanism.

The present invention is directed towards a system for storing and releasing a cable that extends between an ROV and a support ship from the ROV if the cable tension exceeds a predetermined force to prevent cable failure. This system can be particularly useful for thin cables that include an optical fiber but do not include electrical conductors for powering the ROV. With reference to FIG. 2 a simplified drawing of an ROV 201 is illustrated. The cable 205 can be stored on both a cable storage device 211 on the support vessel 209 as well as in a cable release device 221 on the ROV 201. As the ROV 201 travels away from the support ship 209, the cable 205 is released from the storage device 211. Alternatively, the cable 205 can be stored on the deck of the support ship 209 and can be mechanically or manually released as the ROV 201 travels away from the ship 209.

During normal operations the cable 205 aboard the ROV 201 can remain in reserve and it may not be used. The ROV 201 can operate normally by using horizontal and vertical thrust 215 to pull the cable 205 through the water and drag it off the surface main supply reel 552 in the cable storage device 211. Such a surface main supply reel 552 may use a rotary optical joint to allow its rotation while maintaining optical path between the ROV 201 and a controller or communications device 558 on the support vessel 209. Alternatively, the surface cable 205 can be stored without a reel 552.

For example, the cable 205 can be flaked in a figure eight or similar lay to prevent twisting on the deck and manually deployed overboard as needed by a crew member. The storing and deploying the cable 205 can be performed by a crew member who is controlling the operation of the reel 552 or pulling cable 205 from the reel 552 or deck and assisting the cable 205 over the side of the support vessel 209.

As the ROV 201 travels away from the support vessel 209, the cable 105 is pulled through the water and the propulsion system 213 must produce enough thrust 215 to overcome the hydrodynamic drag forces on the ROV 201 and the cable 205. The cable 205 drag forces can be proportional to the exposed surface area which is equal to the circumference of the cable 205 times the length of the cable 205. The drag forces also create tension in the cable 205. The amount of tension in the cable 205 can vary along the exposed length of cable 205 due to hydrodynamic drag. Since the ROV 201 pulls the cable 105, the tension at any section of the cable 205 can include all of the drag from the trailing cable 205 back to the support vessel 209. Thus, the highest tension can be at the portion of cable 205 that is adjacent to the ROV 201 and the lowest tension can be at the cable closest to the support vessel 209. The tension in the portions of cable 205 between the ROV 201 and the support vessel 209 can decrease in a linear manner from the ROV 201 to the support vessel 209.

When tensioned, the cable 205 can stretch and may eventually damage the internal conductors or optical fiber. This cable 205 failure can result in a loss of power or data transmission failure. In order to avoid these types of failures, the ROV 201 can have a cable tension control mechanism 221 that includes a tension sensor and a portion of the cable 205 stored on the ROV 201. If the control mechanism 221 detects that the tension has exceeded a predetermined value such as the safe working tension, the control mechanism 221 can release some of the stored cable 205. This extra cable 205 can immediately reduce the cable tension at the ROV 205. Once the tension drops to a safe level below the maximum working tension, the control mechanism 221 can stop the release of the stored cable 205 until excess tension is detected again.

In another embodiment, the control mechanism 221 can also control the rate at which the stored cable 205 is released to maintain the tension below the maximum working tension. Thus, the control mechanism 221 can slowly begin to release cable 205 when the tension approaches the maximum working load and this release rate can increase as the cable 205 tension increases. Because the tension may normally be highest at the exit point from the ROV, the control mechanism 221 can prevent cable 205 failure. In contrast, a system which does not have a tension sensor in the ROV will not be able to detect the highest tension in the cable or be able to reduce this tension to prevent failure due to over tensioning the cable.

As discussed, the tension in the cable 205 can be proportional to the amount of surface area that is being pulled through the water. Thus, a cable that includes electrical conductors used to supply power to the ROV can be much thicker and have a larger circumference and more surface area than a cable 205 that only contains an optical fiber. ROVs 201 are beginning to be designed with on-board power, typically some form of lithium rechargeable battery or other suitable rechargeable battery. Since power does not need to be sent through the cable 205 from the support vessel 209 to the ROV 201, the cable 205 may only be used to transmit data between the ROV 201 and a controller 558 on a support vessel 209. Because only data is being transmitted, the cable 205 can include just an optical fiber for optical data transmissions rather than electrical cables for transmitting electrical power. This new generation of ROVs 201 is able to send high bandwidth command and control communications, sensor data, and HD video signals to the surface via a very small diameter fiber optic cable.

Figure 3:
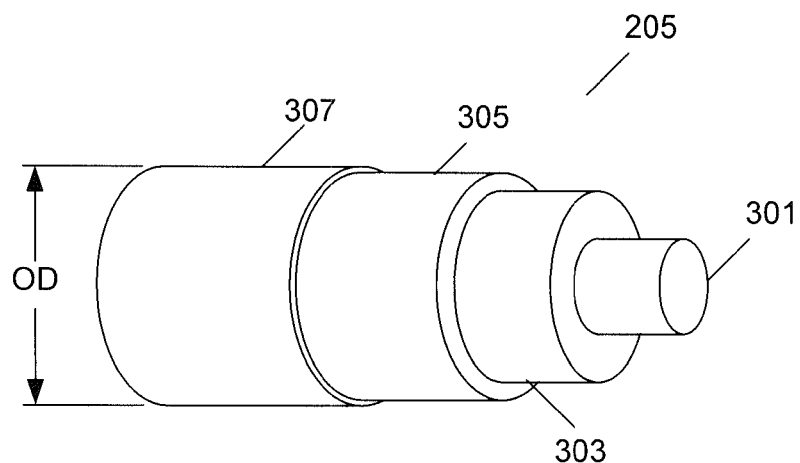
FIG. 3 illustrates a view of an optical cable.

With reference to FIG. 3, in an embodiment, the typical fiber optic cable 205 has a center single-mode optical fiber 301 encased in a plastic sheath 303 surrounded by a high strength jacket member 305 which can be made of a high strength composite fiber such as Kevlar. The high strength jacket member 305 can be surrounded by an abrasion resistant external coating or layer 307 which can be made of urethane or other similar materials. Such cables 205 are becoming standard with outside diameter (OD) that is approximately 2.9 mm. These cables 205 can be used with subsea remote vehicles where the high strength, toughness and abrasion resistance are needed to survive harsh environments.

With reference to FIG. 2, the present invention can use the smaller diameter fiber optic cable 205 that can be partially wound on a drum inside the ROV with the main cable 205 supply wound on a larger main supply drum aboard the surface support vessel. For example, for a 9,000 ft long cable 300, 1,000 ft can be wound on the small drum 553 in the ROV and 8,000 ft can be wound on the main supply drum 552 coupled to a surface support vessel 209. Thus, the small diameter armored fiber cables 205 can be used by ROVs 201 to dive to depths and ranges beyond the limits of prior ROVs which are limited by the hydrodynamic drag forces on the long length of thick cable containing electrical conductors.

When the ROV 201 is initially released from the support vessel 209, the length of cable 205 being dragged through the water is relatively short and the drag forces can be well below the maximum working tension. Using the cable 205 stored on the main cable drum 231 alone, the depth that the ROV 201 is capable of reaching is limited by the ROV thrust 215 and its ability to drag cable 205 through the water. The underwater movement of the cable 205 is resisted by the fluid drag on the outer surfaces of the cable 205 which increases as more cable 205 is placed in the water from the main supply reel 231. Cable drag can include a combination of skin friction drag and form drag depending on how the cable 205 is being pulled. Skin friction drag arises from the friction of the water against the "skin" of the cable 205 that is moving through it. Skin friction arises from the interaction between the water and the surface of the cable 205, and is directly related to the wetted surface which is the area of the surface of the cable 205 that is in contact with the water. Form drag arises from of the shape of the cable 205. The general size and shape of the cable 205 are important factors in form drag. Cables 205 with a larger apparent cross-section will have a higher drag than cables 205 with thinner cross-section. Streamlined cross-sections can also minimize form drag. Both skin and form drag follow the drag equation below.

$$F_D = \tfrac{1}{2} \rho v^2 C_D A$$

where $F_D$ is the force of drag, which is by definition the force component in the direction of the flow velocity $\rho$ is the mass density of the fluid, v is the velocity of the cable relative to the fluid, A is the surface area of the cable, and $C_D$ is the drag coefficient a dimensionless constant related to the cable's geometry and taking into account both skin friction and form drag.

The thrust required to move the ROV can be reduced by lowering the cable drag. Thus, a first ROV having a first maximum thrust will have a first maximum depth and/or range that are proportional to the first maximum thrust. A second ROV which can have double the maximum thrust can overcome twice the amount of drag and therefore can have twice the maximum depth and/or range of the first ROV. However, by reducing the cable diameter by one half, the surface area and drag on the cable from the water can also be reduced by at least 50% or more. Thus, by using a cable having a diameter that is 50% smaller, an ROV can significantly increase by more than double the maximum depth or range without increasing the thrust output of the ROV. This improved functional performance with reduced cable drag can provide a significant performance advantage for a an ROV having an internal battery which only requires a thin optical fiber cable compared to an ROV supplied with electrical power from a surface support vessel having a thicker cable.

However, if thinner cables are used to reduce cable drag, there can be a potential strength problem in using small diameter fiber cables which may be more fragile than thicker cables having more tensile strength. If the desirable vehicle maximum thrust is about 100 lbs, the ROV can in certain circumstances over tension or strain the cable which can damage the optical fiber in the cable. Although the Kevlar-strengthened small diameter cable 205 illustrated in FIG. 3, may not mechanically break until being loaded to 400 lbs or more, the optical fiber core 301 can be damaged if a tension above 70 lbs is applied to the cable 205. Thus, a small cable 205 may have a maximum safe working tension of about 50 lbs or less.

With reference to FIG. 2, in order to protect the cable 205 and extend the depth and range of battery powered ROVs with small diameter fiber optic cables 205, the inventive system includes a cable storage device 553 on the ROV 201 which can be a drum or a spool aboard the 201 onto which a portion of the cable 205 is wound. The ROV cable storage device 553 is controlled so that it does not pay out under normal circumstances and the cable 205 remains locked within the ROV 201 until the cable 205 tension reaches or approaches its maximum allowed operating tension, which can be 50 lbs. Alternatively, the rate of cable release can be variable. For example, the cable 205 can be released at 40 lbs at a slow rate and then released at a much faster rate as the tension increases so that the tension never reaches 50 lbs.

The depth or range at which the surface supplied cable 205 reaches its maximum operational tensile limit will vary greatly depending on many factors including: the speed of the vehicle, the speed of water currents, the depth of the vehicle, etc. The cable tension can be greatest at its attachment to the ROV 201. The cable release mechanism can measure the cable tension at the vehicle end and that data can be relayed to the support vessel. As the cable tension approaches reaches a predetermined maximum allowable working tension, typically 50 lbs, the tether is released from the vehicle and the vehicle spool is paid out to relive tension and enable the vehicle to continue as needed deeper and/or further. The release of the cable by the cable release mechanism on the ROV 201 can be either an automated control mechanism or in response to a manually operated control signal from the support vessel.

Figure 4:
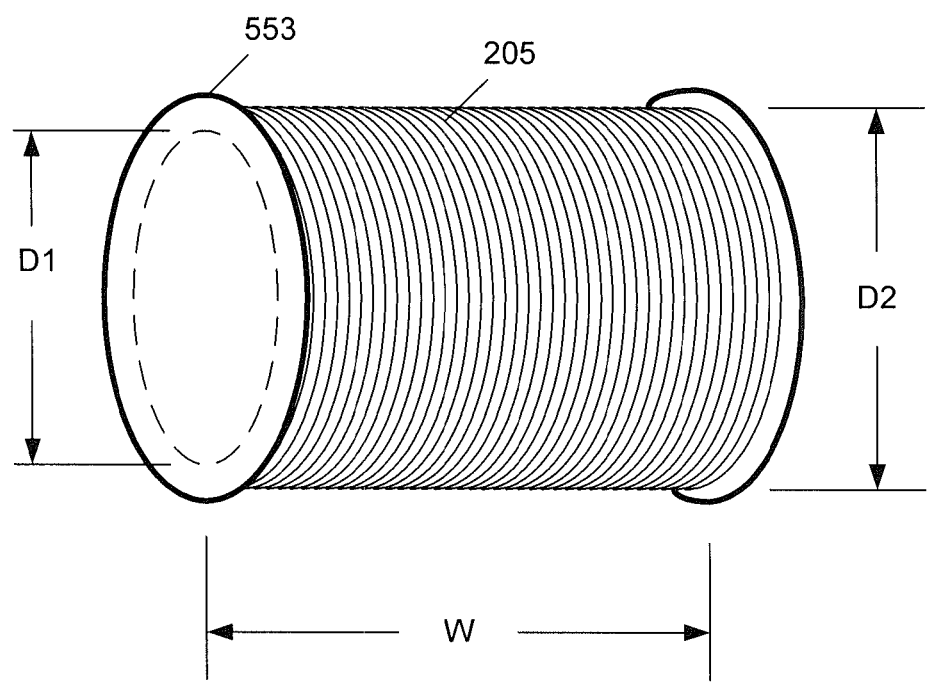
FIG. 4 illustrates a view of an optical cable spool.

In an embodiment, the ROV 201 can carry an onboard store of 1,000 feet of cable 205 that can enable the ROV 201 to continue 1,000 ft deeper and/or further than the limits of what could have otherwise been achieved without damaging the small diameter optical fiber. With reference to FIG. 4, 1,000 feet of 2.9 mm cable 205 can be stored on a drum, spool or other structure 553 having a 10 cm core diameter (D1) that is 25 cm wide (W) with ten layers to 16 cm diameter cable 205 so that the outer diameter of the cable 205 can be about 25 cm+10×0.29 cm=27.9 cm (D2). Because the cable 205 and spool 553 do not occupy a substantial amount of space, they can be stored on the ROV.

Figure 5:
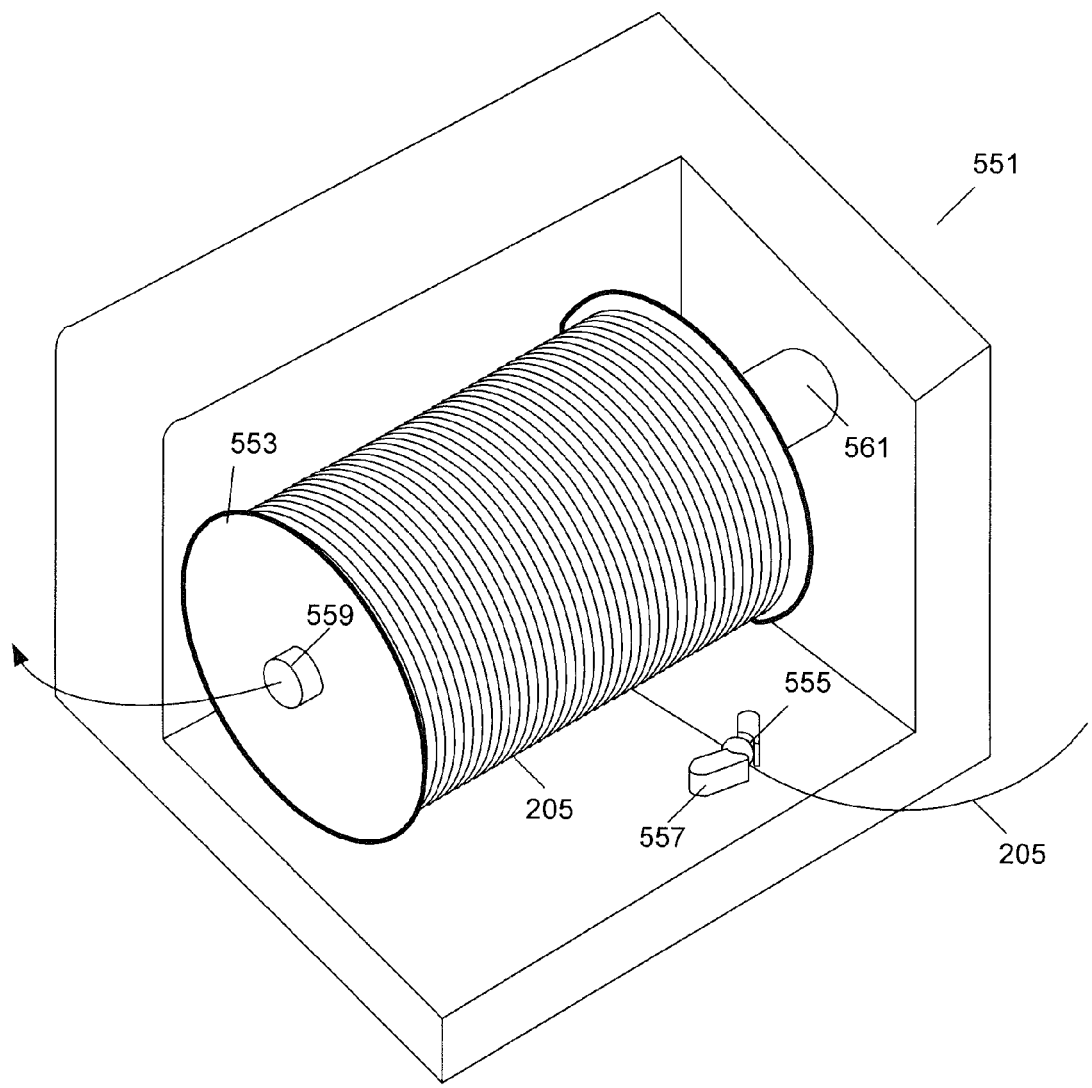
FIG. 5 illustrates an embodiment of an optical cable tension control mechanism.

With reference to FIG. 5, an embodiment of a cable release mechanism 551 is illustrated which can be used on the ROV. The cable release mechanism 551 includes a spool 553 storing a portion of the cable 205. The spool 553 can be aligned transversely with the ROV so that the center axis is perpendicular to the center line of the ROV. A locking block 555 that can be bonded to the cable 205 that engages locking arms 557. The locking block 555 can prevent the cable 205 from being removed from the spool 553 until a tension above a predetermined tension is detected by the cable release mechanism 551. The predetermined tension of the locking arms 557 can be equal to or less than the safe working tension of the cable 205. When the predetermined tension is detected, the locking block 555 can be released from the locking arms 557 and the spool 553 can rotate to release the cable 205. The spool 553 can be coupled to an optical slip ring 559 which allows the optical fiber 205 to rotate while transmitting signals to the ROV. In other embodiments, locking arms 557 may be controlled by control signals from a support vessel.

The spool 553 can also be coupled to a torque controller 561 which can apply rotational resistance to control the rotation of the spool 553 and the release rate of the cable 205 from the ROV. The torque controller 561 can be configured to apply a steady frictional resistance so that when the tension is below, the predetermined tension, the spool 553 rotation can be stopped or very slow. However, if the tension is significantly higher than the predetermined value, the rate of rotation can be increased proportionally to reduce the tension below the maximum working load.

If the cable tension remains near or above the maximum working loads, the cable 205 can continue to be released from the ROV until the stored cable 205 is depleted. However, this may problematic because the lack of cable 205 on the ROV will prevent the cable tension from be relieved if the predetermined cable release tension is exceeded and the cable 205 is depleted. In an embodiment, the cable release mechanism 551 can transmit signals to indicate that the predetermined tension has been exceeded and indicate the quantity of cable 205 remaining on the spool 553. The cable release mechanism 551 may be able to determine the length of cable 205 released by counting the number of rotations of the spool 553 when the cable 205 is released. As shown in the skin and form drag equations above, the cable drag is proportional to the cable 205 velocity through the water squared. Thus, if necessary, an operator of the ROV 201 can transmit a signal from the support vessel to reduce the ROV 201 speed to reduce the tension in the cable 205. This slower speed can prevent the ROV 201 from running out of cable 205.

Figure 6:
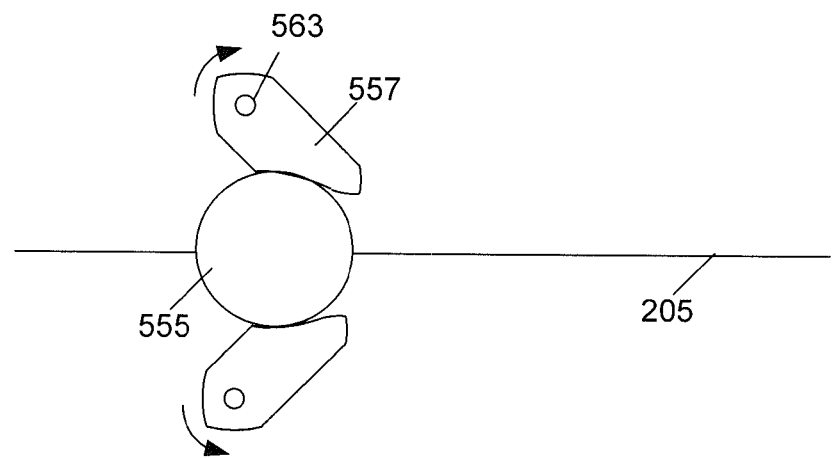
FIGS. 6 and 7 illustrate details of the optical cable tension control mechanism.
Figure 7:
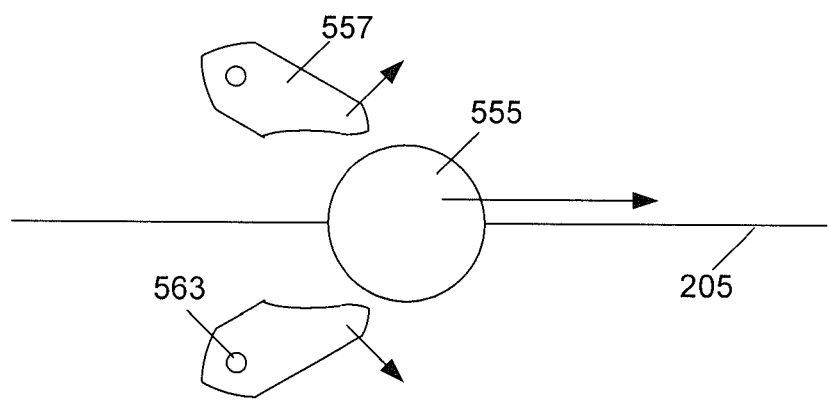

With reference to FIGS. 6 and 7, a more detailed illustration of the block 555 coupled to the cable 205 and the locking arms 557 are illustrated. The locking arms 557 can rotate about pivot points 563 and a torque can be applied to the locking arms 557 to hole the block 555 in place to prevent cable 205 from being released. If the cable tension force exceeds the force of the arms 557 against the block 555, the arms 557 will rotate and release the block 555 which will allow the cable 205 to be released from the ROV as described above. In other embodiments, the arms 557 can be controlled manually by a controller on the support vessel. If the operator detects the tension in the cable above the maximum working load, a controller can transmit a signal to the ROV to release the locking arms 557. The manual control can be used together with the automatic cable release system.

Figure 8:
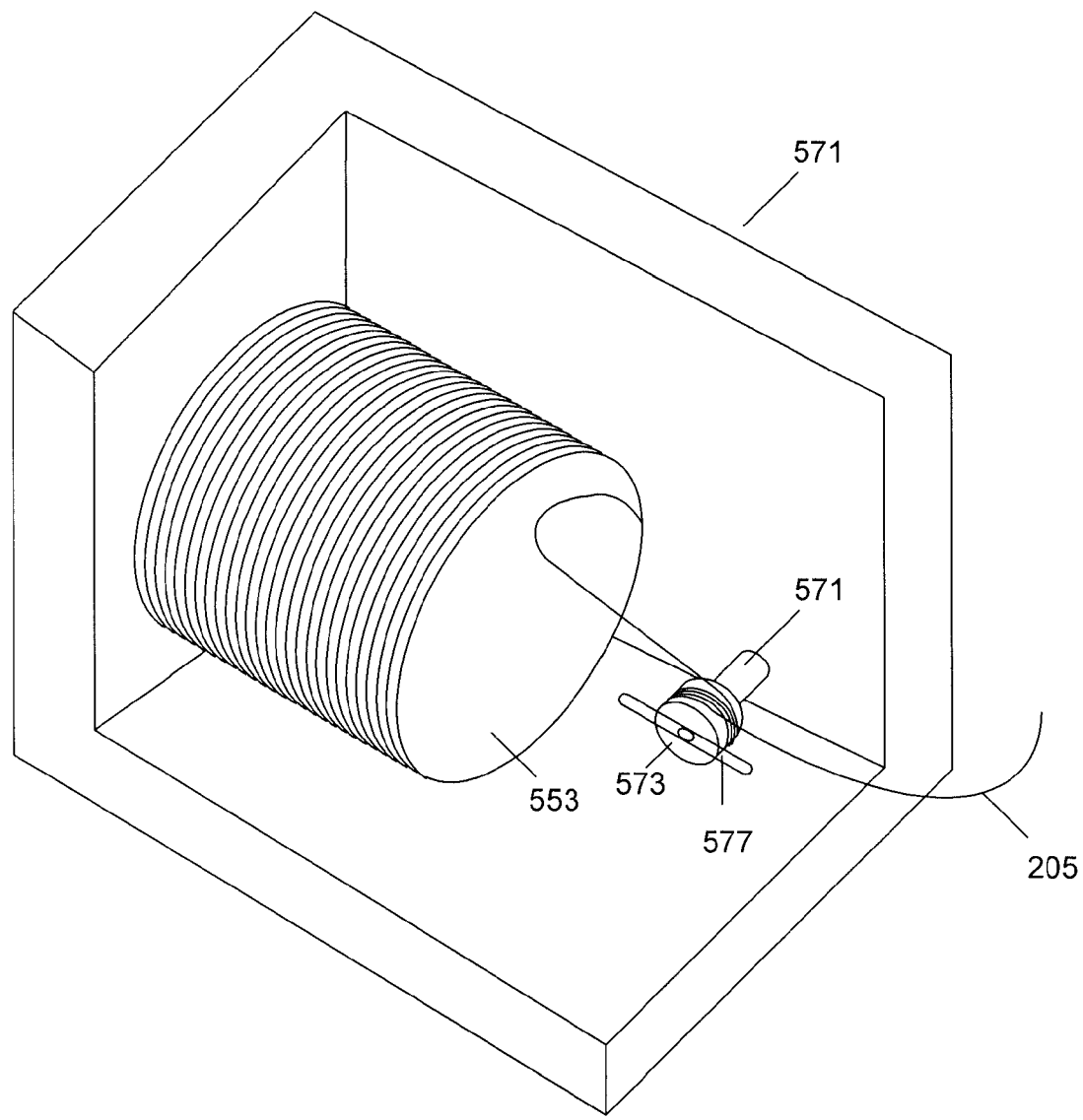
FIG. 8 illustrates an embodiment of an optical cable tension control mechanism.

With reference to FIG. 8, an alternative embodiment of a cable release mechanism 571 is illustrated. In this embodiment, the spool 553 can be aligned with the center axis parallel to the center line of the ROV 201. The spool 553 can also be mounted in a manner that does not require the spool 553 to rotate. The cable 205 can be removed from one end of the spool 553 in a spiral manner without rotation. In other embodiments, the spool 553 can be configured in a transverse manner or the cable 205 can be placed in any other suitable cable 205 storage device on the ROV. In this embodiment, the cable 205 is then wrapped several times around a capstan pulley 573. When tensioned, the cable 205 will be wrapped more tightly around the pulley 573 such that the cable 205 is locked if the capstan pulley 575 is locked. The pulley 573 can have a high friction surface such as a textured rubber outer surface so that the cable 205 does not slide over the surface of the pulley 573 when the cable 205 is tensioned.

A strain monitoring device 577 can be coupled to the cable release mechanism 571 and measurement signals from the strain monitoring device 577 can be used to determine if the predetermined tension has been exceeded. The strain gauge instrument 577 can measure the strain on the holding block or capstan pulley 573. The strain gauge measures any deformation of the holding block or capstan pulley. Based upon the deformation, the pulling force of these components and the tension of the cable 205 can be calculated. The strain gauge 577 output can be transmitted to a control system on the cable release mechanism 571 and/or through the cable to the support vessel. If the tension exceeds the predetermined value which can be the maximum working tension or less, the cable release mechanism 571 can allow the pulley 575 to rotate and release the stored cable 205. The rate of release of the cable 205 can be controlled by a torque control device 571 which applies rotational friction to the rotation of the pulley 575. Thus, the strain gauge 577 output can be used to automatically release the cable 205. Alternatively, the cable tension information can be reviewed by an operator on the support vessel and the operator can send a cable release signal to the cable release mechanism 571. The manual control can also be used together with the automatic cable release mechanism 571.

Figure 9:
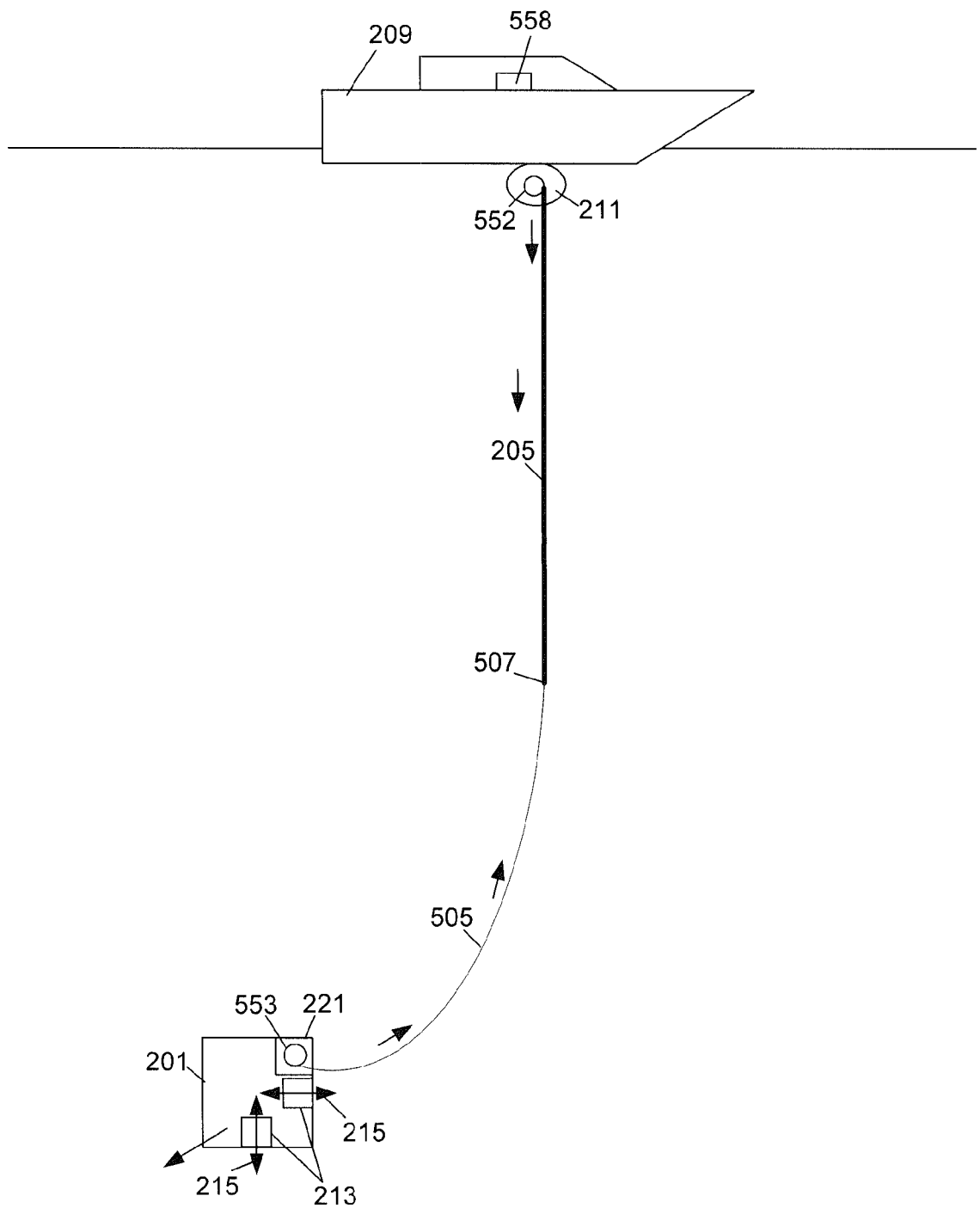

In other embodiments of the same invention, a hybrid cable 505 can include a first section having a first cable 205 which was described above with reference to FIG. 3, that is coupled to a second cable 501 which can be the raw optical fiber having an outer diameter of about 0.254 mm. With reference to FIG. 9, the first cable 205 can be fused or optically coupled at a connection point 507 to a second cable 501 which can be the raw optical fiber. Data transmitted between the ROV 201 and the support vessel 209 can be transmitted through both the first cable 205, the connection point 507 and the second cable 505. In other embodiments, it is possible to only form the protective layers on the first cable 205 portion of the hybrid cable 505 so that the optical fiber can be a single continuous component.

The armored fiber cable 205 can initially be attached to the ROV 201 and placed in the water at the support vessel 209 as the ROV 201 travels away from the support vessel 209. The ROV 201 can continue to store a long length of the thinner raw optical fiber cable 501 that is held in the ROV 201 until it needs to be released. In an embodiment, the first cable 205 can be fully released and can extend down from the support vessel before the ROV 201 releases the second cable 501 and continues to dive. After the first cable 205 is completely released, the ROV can continue to travel away from the support vessel 209 by releasing the second cable 501. This hybrid cable 505 can allow the ROV to make very long and deep dives. In this embodiment, the ROV may store a longer length of the second cable 501 than the length of the first optical cable 205. Once the dive is complete, the ROV and the first cable 205 can be recovered, while the second cable 501 can be broken in the water.

Very longest and deep dives can be achieved by storing a very large quantity of raw, 0.01 inch diameter fiber aboard the vehicle and releasing that through a fiber management system. Thus, the first stage of the vehicle deployment can be achieved with the recoverable armored small diameter cable 205 until the limits of its deployment are reached and the rest of the vehicle mission uses disposable optical fiber. This is further described in U.S. patent application Ser. No. 12/795,971, "Ocean Deployable Biodegradable Optical Fiber Cable" which is hereby incorporated by reference.

Alternatively since many missions can be completed using only the recoverable surface deployed small diameter armored fiber cable 205, the second fiber cable 501 may only be released from the ROV 201 in the event of an emergency, such as if the armored cable 205 is caught and this threatens to trap the ROV 201. The multi mode fiber deployment system described in this invention can allow for simple surface cable to be used while retaining the increased depth and range advantages of vehicle stored cable payout.

It will be understood that the inventive system has been described with reference to particular embodiments, however additions, deletions and changes could be made to these embodiments without departing from the scope of the inventive system. Although the systems that have been described include various components, it is well understood that these components and the described configuration can be modified and rearranged in various other configurations.

What is claimed is:

1. A cable tension control apparatus comprising:
   a cable that includes an optical fiber for transmitting data between a controller on a surface vessel and a remotely operated underwater vehicle;
   a first storage device coupled to the surface vessel for storing a first portion of the cable;
   a spool mounted on the remotely operated underwater vehicle for storing a second portion of the cable;
   a release mechanism which controls the removal of the second portion of the cable from the spool; and
   a tension sensor for detecting the tension in the cable;
   wherein the first portion of the cable is released from the first storage device when the tension in the cable is lower than a predetermined value and the second portion of the cable is released from the spool by the release mechanism when the tension sensor detects that the tension in the cable is greater than the predetermined value.

2. The apparatus of claim 1 wherein the predetermined value is greater than 50 pounds of tension.

3. The apparatus of claim 1 wherein the release mechanism includes a block bonded to the second portion of the cable and mechanical locks which prevent the block from moving until the tension in the cable is greater than the predetermined value.

4. The apparatus of claim 1 further comprising:
   an optical slip ring;
   wherein the data is transmitted through the optical slip ring.

5. The apparatus of claim 1 wherein the release mechanism includes a rate controller for controlling the rate that the second portion of the cable is removed from the spool when the tension in the cable exceeds the predetermined value.

6. The apparatus of claim 5 wherein the rate that the second portion of the cable is removed from the spool is proportional to the tension of the cable above the predetermined value.

7. The apparatus of claim 5 wherein the removal rate controller includes a torque controller which controls the rotational friction of the spool.

8. The apparatus of claim 1 wherein release mechanism includes a pulley and the cable is wrapped around the pulley two or more times.

9. The apparatus of claim 8 wherein the pulley is locked when the tension in the cable is below the predetermined value.

10. The apparatus of claim 8 wherein the pulley is coupled to a torque controller for controlling the rotational friction of the pulley.

11. A cable tension control apparatus comprising:
- a cable that includes an optical fiber for transmitting signals between a controller on a surface vessel and a remotely operated underwater vehicle;
- a first storage device coupled to the surface vessel for storing a first portion of the cable;
- a second storage device on the remotely operated underwater vehicle for storing a second portion of the cable;
- a release mechanism which controls the removal of the second portion of the cable from the second storage device; and
- a tension sensor for detecting the tension in the second portion of the cable;
- wherein the first portion of the cable is released from the first storage device when the tension in the cable is lower than a predetermined value and the second portion of the cable is released from the second storage device by the release mechanism when the tension sensor detects that the tension in the cable is greater than the predetermined value.

12. The apparatus of claim 11 wherein the predetermined value is greater than 50 pounds of tension.

13. The apparatus of claim 11 wherein the release mechanism includes a block bonded to the second portion of the cable and mechanical locks which prevent the block from moving until the tension in the cable is greater than the predetermined value.

14. The apparatus of claim 11 further comprising:
- an optical slip ring;
- wherein the data is transmitted through the optical slip ring.

15. The apparatus of claim 11 wherein the release mechanism includes a rate controller for controlling the rate that the second portion of the cable is removed from the storage device when the tension in the cable exceeds the predetermined value.

16. The apparatus of claim 15 wherein the rate that the second portion of the cable is removed from the storage device is proportional to the tension of the cable above the predetermined value.

17. The apparatus of claim 15 wherein the removal rate controller includes a torque controller which controls the removal rate from the storage device.

18. The apparatus of claim 11 wherein release mechanism includes a pulley and the cable is wrapped around the pulley two or more times.

19. The apparatus of claim 18 wherein the pulley is locked when the tension in the cable is below the predetermined value.

20. The apparatus of claim 18 wherein the pulley is coupled to a torque controller for controlling the rotational friction of the pulley.

* * * * *